US012662049B2

(12) United States Patent
Rottenkolber

(10) Patent No.: US 12,662,049 B2
(45) Date of Patent: Jun. 23, 2026

(54) METHOD FOR OPERATING A LIGHTING DEVICE IN A MOTOR VEHICLE DURING AN AUDIO OUTPUT OF A BREATHING EXERCISE IN THE MOTOR VEHICLE

(71) Applicant: Audi AG, Ingolstadt (DE)

(72) Inventor: Maximilian Rottenkolber, Oberdolling (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 19/286,852

(22) Filed: Jul. 31, 2025

(65) Prior Publication Data

US 2026/0034930 A1      Feb. 5, 2026

(30) Foreign Application Priority Data

Aug. 2, 2024    (DE) ..................... 10 2024 122 078.3

(51) Int. Cl.
| | |
|---|---|
| *B60Q 3/80* | (2017.01) |
| *B60Q 3/74* | (2017.01) |
| *H05B 47/165* | (2020.01) |

(52) U.S. Cl.
CPC ................. *B60Q 3/80* (2017.02); *B60Q 3/74* (2017.02); *H05B 47/165* (2020.01); *B60Q 2900/40* (2022.05)

(58) Field of Classification Search
CPC ........... B60Q 3/80; B60Q 3/74; H05B 47/165
See application file for complete search history.

(56) References Cited

U.S. PATENT DOCUMENTS

| | | | |
|---|---|---|---|
| 2022/0172489 A1* | 6/2022 | Wieczorek | ........... B60N 2/0025 |
| 2022/0371605 A1* | 11/2022 | Moton, Jr. | ........ B60W 50/0098 |
| 2022/0418064 A1* | 12/2022 | Cremer | ................ H05B 47/105 |
| 2024/0027060 A1* | 1/2024 | Ikeda | ........................ B60Q 3/74 |
| 2024/0166127 A1* | 5/2024 | Wang | ........................ B60Q 9/00 |
| 2024/0286623 A1* | 8/2024 | Le-Hir | ................... B60K 35/80 |
| 2025/0261293 A1* | 8/2025 | Schembs | .............. H05B 47/125 |

FOREIGN PATENT DOCUMENTS

| | | |
|---|---|---|
| DE | 10 2014 219 892 A1 | 4/2016 |
| DE | 10 2017 213 998 A1 | 2/2019 |
| DE | 10 2021 208 986 A1 | 2/2023 |
| DE | 10 2022 103 448 B3 | 8/2023 |

OTHER PUBLICATIONS

German Office Action issued in counterpart German Application No. 10 2024 122 078.3 dated Mar. 20, 2025.

* cited by examiner

*Primary Examiner* — Bryon T Gyllstrom

(74) *Attorney, Agent, or Firm* — STAAS & HALSEY LLP

(57)      ABSTRACT

Operation of a lighting device in a motor vehicle during an audio output of a breathing exercise in the motor vehicle may include obtaining an audio file, which is intended for an audio output in the motor vehicle and describes a breathing exercise; and recognizing at least two different sections of the breathing exercise by applying a section recognition criterion to the audio file. For each of the recognized sections, ascertaining an actuation command for actuating the lighting device during the audio output of the section; and outputting the audio of the breathing exercise by an audio output device in the motor vehicle, such that the lighting device is operated at the same time according to the actuation command for the audio section which is currently being output.

10 Claims, 2 Drawing Sheets

METHOD FOR OPERATING A LIGHTING DEVICE IN A MOTOR VEHICLE DURING AN AUDIO OUTPUT OF A BREATHING EXERCISE IN THE MOTOR VEHICLE

CROSS-REFERENCE TO RELATED APPLICATIONS

This application claims the priority benefit of German Patent Application No. 10 2024 122 078.3 filed on Aug. 2, 2024, which is incorporated by reference herein in its entirety.

BACKGROUND

1. Field

An invention relates to a method for operating a lighting device in a motor vehicle during an audio output of a breathing exercise in the motor vehicle, according to described examples. Moreover, the invention relates to a motor vehicle for performing such a method, according to described examples.

DESCRIPTION OF THE RELATED ART

A motor vehicle can comprise an audio output device, by means of which, for example, music or other audio content can be output in the motor vehicle. Furthermore, an actuation of a lighting device in the motor vehicle can be adapted to the output of the output device, so that, for example, the music output in the motor vehicle can be optically visualized by means of the lighting device. In this context, for example, a color of light which is emitted by means of the lighting device can be adapted to a course of a volume of the output music, in order to enable an orchestrated music experience in the motor vehicle.

The optical visualization of the output of the output device by means of the lighting device typically takes place in the same manner for various types of outputs, i.e. it is not taken into consideration whether music or, for example, a breathing exercise is output.

DE 10 217 213 998 A1 discloses a method for guiding a physiological exercise for a user of a motor vehicle. For this purpose, physiological parameters of the user are detected and a first light source of the motor vehicle is actuated such that the physiological parameters are visualized by this first light source. A psychological exercise for the user is then selected and a second light source is actuated such that the guide to the physiological exercise is visualized by this second light source.

DE 10 2021 208 986 A1 discloses a wellness arrangement for a vehicle for guiding a breathing exercise. The wellness arrangement comprises a function device for executing a guiding function for guiding a breathing rhythm in the context of the breathing exercise.

DE 10 2014 219 892 A1 discloses assistance for breathing of a vehicle driver. For this assistance, a state parameter of the vehicle driver is detected by means of a sensor. At least one signal, which is capable of directly or indirectly influencing the breathing of the vehicle driver, is output depending on the detected state parameter.

SUMMARY

An example object of the invention may be to provide a solution by which a lighting device in a motor vehicle can be reasonably operated during the audio output of a breathing exercise.

The example object may be achieved by the subject matter of the claims.

One aspect of the invention according to the examples relates to a method for operating a lighting device in a motor vehicle during an audio output of a breathing exercise in the motor vehicle. The lighting device comprises, for example, at least one lighting element, such as at least one light-emitting diode (LED). The lighting device can comprise, for example, at least one light bar, in particular an LED light bar, a display screen, and/or another light source in the motor vehicle. The audio output can take place, for example, by an audio output device in the motor vehicle. The audio output device is, for example, a loudspeaker device, which comprises at least one loudspeaker.

A breathing exercise in the meaning of the examples of the invention is provided in the form of an audio file. The breathing exercise comprises, for example, at least one instruction for how a person is to breathe. In one example, the breathing exercise can specify a breathing rhythm by way of multiple instructions. The breathing exercise can, for example, assist a listener, such as an occupant of the motor vehicle here, to improve his concentration, relax, and/or relieve stress. The breathing exercise can be, for example, between 2 minutes and 3 minutes long. Alternatively or additionally thereto, the breathing exercise can be shorter than 2 minutes long or longer than 3 minutes, in particular up to 4 minutes or 5 minutes. The breathing exercise can be selected, for example, by an occupant of the motor vehicle and its audio output can be effectuated in the motor vehicle. For this purpose, the audio file of the breathing exercise can be stored in a storage device of the motor vehicle, which is in particular comprised by the control device or assigned thereto, and/or can be received from an external device. The external device can be a mobile terminal, a server, a back-end, a cloud, and/or another motor vehicle. The audio file is transmitted from the external device to the motor vehicle, for example, without a cable, in particular wirelessly, or via a cable, in particular in a wired manner.

The invention according to the examples is at least based on the finding that in the case of operation of the lighting device during an arbitrary audio output in the motor vehicle, the lighting device is typically always actuated depending on a course of the volume of the output audio file or another feature of the audio file. It is thus not differentiated what type of audio file is output. However, in the case of breathing exercises which alternately have speech and music, this can result in unsuitable visualizations of the breathing exercise, above all since the breathing exercise typically has a high proportion of speech segments. The operation of the lighting device is therefore to be specifically adapted to the breathing exercise.

The method comprises providing an audio file, which is intended for an audio output in the motor vehicle and which describes a breathing exercise. It is thus presumed that an audio file which describes the breathing exercise is already present. The further method is only carried out, for example, if the provided audio file describes a breathing exercise.

At least two different sections of the breathing exercise are recognized by applying a section recognition criterion to the provided audio file. The audio file is thus analyzed and evaluated, wherein it is divided into at least two parts. Thus, for example, a first section and at least one second section, which is different from the first section, are recognized. In an example, the audio file is divided into more than two sections. An introductory phase of the breathing exercise and the actual breathing exercise, i.e. an exercise phase of the breathing exercise, can be distinguished as the at least two sections, for example. In one example, multiple different partial exercise phases of the exercise phase can be distinguished. Partial exercise phases can result, for example, if a breathing rate and/or another aspect of a breathing technique changes in the context of the breathing exercise.

The section recognition criterion comprises at least one rule and/or one algorithm, which, when it is performed on the basis of the audio file, can recognize the individual sections of the breathing exercise and distinguish them from one another. For example, upon the application of the section recognition criterion, a waveform analysis can be performed, on the basis of which speech segments and/or music segments and/or calm segments without speech and/or music and/or noise can be recognized. In the waveform analysis, a display of a content of the audio file in wave form can be used. In this display, for example, a waveform of an audio signal that is described by the audio file is plotted over a time course of the audio signal, for which, for example, an electron beam of an oscilloscope is caused to run in a certain frequency over a display area, by which the waveform of the audio signal is displayed. Alternatively or additionally to the waveform, another type of audio visualization can be used. Audio visualization designates a dynamic display of, for example, graphics and/or animations on the basis of the audio file. For example, the audio file, in particular individual parts of the audio file, can be graphically displayed broken down according to frequencies. In this type of audio visualization, for example, a fast Fourier transform can be performed and amplitudes can be recognized and, for example, logarithmically plotted. Alternative or additional types of the audio visualization are possible, for example a panoramic display or correlation display between multiple audio channels and/or a volume display in the form of a bar (level meter or peak meter). After the content of the audio file and therefore the breathing exercise has been displayed in accordance with one of the mentioned types of the audio visualization, the speech segments and/or music segments and/or calm segments without speech and/or music and/or noise can be identified as such and evaluated. The sections of the breathing exercise can be recognized on the basis of characteristic features of the speech segments and/or music segments and/or calm segments without speech and/or music and/or noise. The section recognition criterion thus recognizes when the audio file describes pure speech, when music is played, and/or when a calm phase, i.e. a calm segment, is present. In an example, the display of the waveform is selected for the audio visualization.

A speech segment is a part of the breathing exercise in which spoken speech is output. The spoken speech can optionally be underlaid with music and/or other noises. The speech segment can alternatively be referred to as a speech phase. A calm segment is a part of the breathing exercise in which there is neither speech nor are music or noises output. In the calm segment, the listener is therefore confronted with calm or silence. The calm segment can alternatively be referred to as a calm phase. A music segment is a part of the breathing exercise in which music is output. The music segment can alternatively be referred to as a music phase. A noise can be understood in one example as part of a music segment or as a separate type of content of the audio file. The noise is, for example, an auditory perception, which cannot be referred to as a sound, tone, tone mixture, harmony, or sound mixture. The noise therefore does not have an exactly determinable tone level. The noise can be, for example, random noise, in particular ocean noise or wind noise. If the audio file describes a noise, it can have a noise segment. This can alternatively be referred to as a noise phase.

The method comprises that for each of the recognized sections, an actuation command is ascertained for actuating the lighting device during the audio output of the section. A separate actuation command is thus generated for each section. For this purpose, for example, an actuation command ascertainment criterion can be applied to the part of the audio file which describes the respective section of the breathing exercise. The actuation command ascertainment criterion can comprise, for example, at least one algorithm and/or one rule, which, when it is performed, can determine an actuation command for the lighting device which is suitable for or matches the section. In the case of precisely two sections, precisely two actuation commands can be ascertained, which are in particular different from one another.

The method comprises an audio output of the breathing exercise by the audio output device in the motor vehicle, wherein at the same time the lighting device is operated according to the actuation command for the section which is currently output. The ascertainment of the actuation commands thus, for example, always takes place chronologically before an audio output of the breathing exercise. An audio output and actuation of the lighting device adapted to one another takes place, wherein precisely the actuation command is always specified for the lighting device which is assigned to the section which is currently being output in the context of the audio output of the breathing exercise. If the introductory phase and exercise phase are distinguished, for example, an intensity of the light emitted by the lighting device can be gradually reduced during the introductory phase according to an actuation command provided for the introductory phase, for example. During the exercise phase, light can then be emitted continuously at the reduced intensity according to an actuation command provided for the exercise phase. Alternatively or additionally thereto, for example, a color of the emitted light can be specified differently in the two sections. In this way, the breathing exercise is visually assisted by the lighting device. A particularly advantageous visual orchestration is therefore achieved by the lighting device. The method therefore enables a lighting device in a motor vehicle to be able to be operated reasonably during the audio output of a breathing exercise.

The method can be performed, for example, by a control device of the motor vehicle. The control device can be configured to actuate the lighting device and the audio output device.

One example provides that before the provision of the audio file, it is checked whether this audio file describes a breathing exercise. This takes place in that a breathing exercise recognition criterion is applied to the audio file. The audio file is only actually provided if it is established in this case that the audio file describes the breathing exercise, so that thereupon at least two different sections of the breathing exercise can be recognized. The breathing exercise recognition criterion comprises, for example, at least one algorithm and/or one rule, which, when it is applied to the audio file, can determine whether or not it is a breathing exercise. It can be ensured by the check of whether a breathing exercise is present at all, such that sections of audio files which do not describe breathing exercises at all are not recognized. The method becomes particularly efficient in this way since, for example, an arbitrary audio file selected by a user of the motor vehicle in the motor vehicle is initially checked and the other above-described method steps are only performed if it relates to a breathing exercise. This is particularly energy-efficient since the method is only performed in reasonable cases.

In an example, upon the application of the breathing exercise recognition criterion, it is checked whether the audio file has a ratio of speech segments to calm segments, music segments, and/or noise segments which is characteristic for a breathing exercise. For example, in breathing exercises it is typical for the exercise phase that short speech segments which prompt the user to inhale or exhale take place again and again. A calm segment and/or a music segment and/or a noise segment can adjoin each of these speech segments. A ratio of speech to calm, music, and/or noise typical for a breathing exercise can therefore be specified, which is taken into consideration, for example, when performing the method.

Alternatively or additionally thereto, upon the application of the breathing exercise recognition criterion, it can be checked whether the audio file has an overall duration characteristic for a breathing exercise. A breathing exercise is, for example, generally between 2 minutes and 3 minutes long. Alternatively thereto, it can be between 30 seconds and 2 minutes or between 3 minutes and 5 minutes long. Total durations between the mentioned limiting values are possible. If an audio file is significantly longer, and therefore has an overall duration of, for example, more than 5 minutes, this can be an indication that another type of audio file is present and not a breathing exercise. For example, the longer audio file can be an audiobook or an audio drama. The characteristic overall duration can thus be used, for example, as a delimitation from other audio files which comprise speech segments.

Alternatively or additionally thereto, it can be checked upon the application of the breathing exercise recognition criterion whether the audio file has a repetition of speech segments characteristic for a breathing exercise. Especially in the exercise phase of the breathing exercise, a repetition of breathing instructions which always remain the same typically takes place, in particular at a predetermined rhythm. These breathing instructions are thus described again and again by the audio file with a predetermined repetition rate. It can therefore be concluded on the basis of repeating segments of the audio file that a breathing exercise is present and not, for example, another speech output, such as the audiobook and/or audio drama, in which such repeating segments are not expected.

Various characteristic items of information on the basis of which a breathing exercise can be identified are therefore known. Alternatively or additionally thereto, the breathing exercise recognition criterion can comprise further suitable specifications, on the basis of which it can be recognized whether or not the audio file describes a breathing exercise. It is therefore clear that a breathing exercise can be recognized as such reliably by the method and can thereupon, for example, be decomposed into its sections.

Furthermore, in an example, the at least two sections are recognized in that they differ from one another at least in one ratio between speech segments, calm segments, music segments, and/or noise segments. For example, one of the sections can be the exercise phase and can have the repeating speech segments which comprise the breathing instructions, wherein a calm segment, music segment, and/or noise segment can lie between two speech segments. The introductory phase can be distinguished by a speech segment which lasts longer in comparison to the speech segments of the exercise phase and has fewer, in particular no repetitions. Furthermore, the introductory phase can have louder music segments and/or noise segments. In particular, the introductory phase has no calm segments in one example. Therefore, the recognized sections can be recognized on the basis of the ratio of speech segments, calm segments, music segments, and/or noise segments to one another.

Alternatively or additionally thereto, the at least two sections can be recognized in that they differ from one another at least in a length of individual speech segments. The exercise phase typically has shorter speech segments than, for example, the introductory phase. Alternatively or additionally thereto, the at least two sections can be recognized in that they differ from one another at least in a repetition of speech segments. The exercise phase often has identical or at least similar speech segments again and again, which specify breathing movements and therefore the breathing rhythm. In contrast, a nonrepeating speech segment is to be presumed in the introductory phase. It thus becomes clear how the various sections can be unambiguously recognized by the application of the section ascertainment criterion, since they each have different features.

In another example, precisely three different sections may be recognized. These are assigned to the introductory phase, the exercise phase, and a conclusion phase of the breathing exercise. The conclusion phase is used, for example, to end the breathing exercise and comprises, for example, a cohesive speech segment which is long in comparison to the exercise phase and also music segments which are louder and/or longer in comparison to the exercise phase. The introductory phase can alternatively be referred to as the intro of the breathing exercise. The conclusion phase can alternatively be referred to as the outro of the breathing exercise. The exercise phase refers here to the part of the breathing exercise in which the instructions to breathe are output and which therefore represents the actual breathing exercise. The division into three sections of the breathing exercise enables a reasonable classification into multiple actuation phases of the lighting device, due to which a particularly advantageous visual orchestration can take place in the motor vehicle.

In an example, a speech analysis of speech segments of the respective section is carried out. It is checked whether at least one predetermined signal word and/or one predetermined signal word combination is comprised by the section. The signal word can be, for example, "breathe", "inhale", and/or "exhale". The signal word combination can comprise multiple words or at least one entire sentence. If this is the case, i.e. if the respective section comprises the at least one predetermined signal word and/or the at least one predetermined signal word combination, the ascertained actuation command comprises an actuation of the lighting device assigned to the signal word and/or the signal word combination. This actuation in particular takes place simultaneously with the output of the signal word and/or the signal word combination in the scope of the audio output of the breathing exercise. The actuation of the lighting device according to the signal word can thus take place simultaneously with the output of the signal word in the scope of the audio output. Analogously thereto, the actuation of the lighting device according to the signal word combination can take place simultaneously with the output of the signal word combination in the scope of the audio output. In one example, a first color can be assigned to the signal word "inhale", in which light is to be emitted by the lighting device. Moreover, in the example, a second color different from the first color can be assigned to the signal word "exhale". This has the result, for example, that the lighting device always emits light of the first color upon the instruction to inhale and emits light of the second color upon the instruction to exhale, for example. Furthermore, another type of actuation of the lighting device can be provided for the calm segment, music segment, and/or noise segment between the instructions to inhale and exhale, in which, for example, light of a third color or no light is emitted. In this way, the actuation commands can be specified for the sections depending on content, since a corresponding speech analysis has taken place. This results in an even more detailed and more pleasant visual orchestration in the motor vehicle.

The speech analysis can alternatively be understood as the application of a speech analysis criterion to speech segments of the parts of the audio file which are assigned to the respective section of the breathing exercise. The speech analysis criterion or the speech analysis is based on the performance or application of at least one algorithm and/or one rule, which can respectively recognize the signal words and/or signal word combinations. The at least one signal word and/or the at least one signal word combination is stored, for example, in the motor vehicle, in particular in the storage device, and/or can be received by the motor vehicle, in particular upon request.

In an example, the respective ascertained actuation command may specify at least one brightness and/or one color, using which light is emitted during the operation of the lighting device. The brightness can alternatively be referred to as the intensity of the emitted light. A distinction is at least made between light and dark. In particular, the ascertained actuation command can specify a brightness course and/or a color course, wherein the brightness course or the color course relates to the light emitted during operation of the lighting device. The brightness course and/or the color course can alternatively be understood as an animation, during which, for example, different partial areas of the lighting device are actuated differently. The brightness course and/or the color course can provide different actuations of the lighting device considered by location and/or time. It is clear in this way which versatile and visually appealing changes during the operation of the lighting device can be used to assist the audio output.

In another example, each of the recognized sections, moreover a further actuation command is ascertained to actuate at least one vehicle seat of the motor vehicle during the audio output of the section. During the audio output of the breathing exercise, the at least one vehicle seat can then be operated at the same time according to the further actuation command for the section which is currently being output. Alternatively or additionally thereto, for each of the recognized sections, moreover a further actuation command can be ascertained for actuating a climate control device of the motor vehicle during the audio output of the section. During the audio output of the breathing exercise, the climate control device can then be operated at the same time according to the further actuation command for the section which is currently being output.

The further actuation command for actuating the at least one vehicle seat can, for example, activate a massage function of the vehicle seat, so that the massage movements performed by the vehicle seat can be adapted, for example, to the breathing rhythm which is specified in the exercise phase. During the introductory phase and/or the conclusion phase and therefore during other sections, however, no actuation of the vehicle seat can be provided or it is moved into a specified starting position, for example, which is maintained during the exercise phase. Different actuation commands for the vehicle seat result in this way depending on the respective section.

The climate control device can be actuated, for example, by the further actuation command such that it deliberately blows air in the direction of at least one vehicle seat during an instruction to inhale, but pauses or omits this air blast during the instruction to exhale. Furthermore, a temperature increase or temperature reduction in the motor vehicle can be specified during, for example, the exercise phase in comparison to the introductory phase and/or the conclusion phase by the further actuation command. Thus, not only an assistance of the breathing exercises by the lighting device can take place, but moreover an overall advantageous experience of the breathing exercise can be implemented by the vehicle seat and/or the climate control device.

Furthermore, it can initially be ascertained which vehicle seat a person who in particular is performing the breathing exercise is seated on. For this purpose, for example, data of an interior camera of the motor vehicle and/or a vehicle seat occupancy sensor and/or a seatbelt lock sensor and/or a door opening device, which is assigned to a door of the motor vehicle, can be used. The actuation of the vehicle seat and/or the climate control device then in particular takes place specifically for the vehicle seat on which the person is seated.

For applications or application situations which can result in the method and are not explicitly described here, it can be provided that according to the method an error message and/or a request to input user feedback is output and/or a standard setting and/or a predetermined initial state is set.

A further aspect of the invention according to the examples relates to a motor vehicle. The motor vehicle has an audio output device and a lighting device, as were described above, for example. The motor vehicle may be configured to perform the above-described method. The motor vehicle performs the above-described method.

The motor vehicle according to the examples of the invention may be configured as an automobile, in particular as a passenger vehicle or truck, or as a bus or motorcycle.

In an example, the motor vehicle may provide a lighting device that comprises an ambient illumination of the motor vehicle. This is arranged, for example, as an illumination strip or lighting strip in an interior of the motor vehicle. It can be arranged, for example, in a front area and/or in the area of rear seats of the motor vehicle. Alternatively or additionally thereto, the ambient illumination can extend into a foot well of the motor vehicle and/or on at least one door of the motor vehicle. The ambient illumination comprises numerous individually actuatable lighting elements, in particular individual LEDs, in one preferred example.

The invention according to the examples also includes the control device for the motor vehicle. The control device can have a data processing device or a processor device (processor circuit), which is configured to perform the method according to the examples of the invention. The processor device can have for this purpose at least one microprocessor and/or at least one microcontroller and/or at least one FPGA (field-programmable gate array) and/or at least one DSP (digital signal processor). In particular, a CPU (central processing unit), a GPU (graphical processing unit), or an NPU (neural processing unit) can each be used as the microprocessor. Furthermore, the processor device can have program code which is configured to perform the method according to the examples of the invention upon execution by the processor device. The program code can be stored in a data memory of the processor device. The processor device can be based, for example, on at least one circuit board and/or on at least one SoC (system on chip).

The invention according to the examples also includes refinements of the motor vehicle according to the examples of the invention which have features as have already been described in conjunction with the method according to the examples of the invention.

As a further solution, the invention according to the examples comprises a computer-readable storage medium, comprising program code which, upon execution by a computer or a computer network, causes it to carry out the method according to the examples of the invention. The storage medium can be provided at least partially as a nonvolatile data memory (for example, as a flash memory and/or as an SSD-solid-state drive) and/or at least partially as a volatile data memory (for example, as a RAM-random-access memory). The storage medium can be arranged in the computer or computer network. The storage medium can however also be operated, for example, as a so-called app store server and/or cloud server on the Internet. A processor circuit can be provided with at least one microprocessor by the computer or computer network, for example. The program code can be provided as binary code and/or as assembler code and/or as source code of a programming language (for example, C) and/or as a program script (for example, Python). The computer-readable storage medium can alternatively be implemented by a signal having computer-readable data, for example a time-variant voltage signal and/or a radio signal.

The invention according to the examples also comprises the combinations of the features of the described examples. The invention according to the examples thus also comprises implementations which each have a combination of the features of several of the described examples, if the examples were not described as mutually exclusive.

BRIEF DESCRIPTION OF DRAWINGS

Examples of the invention are described hereinafter. In the figures.

DESCRIPTION

The examples explained hereinafter are examples of the invention. In the examples, the described components of the examples each represent individual features of the examples of the invention to be considered independently of one another, which each also refine the examples of the invention independently of one another. Therefore, the disclosure is also to comprise combinations of the features of the examples other than those shown. Furthermore, the described examples can also be supplemented by further features of the examples of the invention already described.

In the figures, identical reference signs each identify functionally-identical elements.

Figure 1:
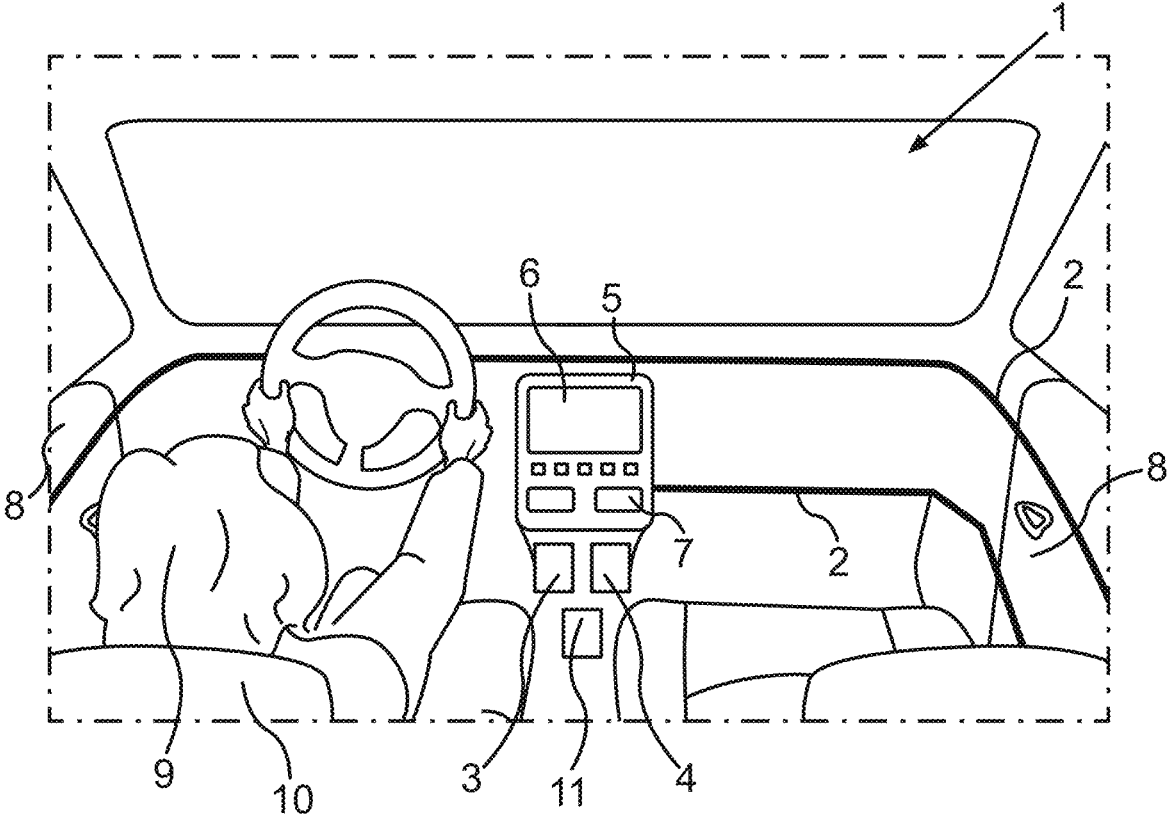
FIG. 1 shows a schematic representation of a partial area of an interior of a motor vehicle, according to an example.

FIG. 1 shows a motor vehicle 1, which has a lighting device 2. The lighting device 2 may be configured, by way of example, as an ambient illumination of the motor vehicle 1. It has, for example, multiple individual lighting elements, which together form at least one light strip that is arranged in the motor vehicle 1. The individual lighting elements are, for example, light-emitting diodes.

The motor vehicle 1 has an audio output device 3, which comprises, for example, at least one loudspeaker. The at least one loudspeaker is arranged, for example, in a door panel of a door 8 of the motor vehicle 1. The audio output device 3 outlined here is not to be understood as restricted to its position in the motor vehicle 1 outlined in FIG. 1. The motor vehicle 1 can furthermore have a control device 4, which may be configured to perform the method described in the context of FIG. 2.

The lighting device 2 extends here at least partially in an area of a center console 5 of the motor vehicle, wherein the lighting device 2 can comprise a display device 6 which is arranged in the center console 5. Furthermore, the lighting device 2 extends here, for example, over at least partial areas of the doors 8 of the motor vehicle 1. Other types of configurations of the lighting device 2 may be possible.

At least in the area of the center console 5, the motor vehicle 1 can have a climate control device 7, i.e., for example, a climate control system or a part of a climate control system of the motor vehicle 1. The climate control device 7 can be arranged, for example, above the display device 6. The climate control device 7 outlined here is not to be understood as restricted to its position in the motor vehicle 1 outlined in FIG. 1.

The motor vehicle 1 can comprise a driver seat 10, on which, for example, a driver 9 sits. Other occupants are not arranged in the motor vehicle 1. It is alternatively possible that additionally or only a front passenger and/or further occupants are arranged in the motor vehicle 1.

A mobile terminal 11 can be arranged in the motor vehicle 1, which can provide, for example, at least one audio file 20 (see reference sign 20 in FIG. 2), which is to be output in the motor vehicle 1. The motor vehicle 1 can output this audio file 20 by the audio output device 3. Alternatively or additionally thereto, the audio file 20 can be saved in a multimedia system of the motor vehicle 1, in particular stored. The motor vehicle 1 and/or the mobile terminal 11 can receive the audio file 20 from an external device.

Figure 2:
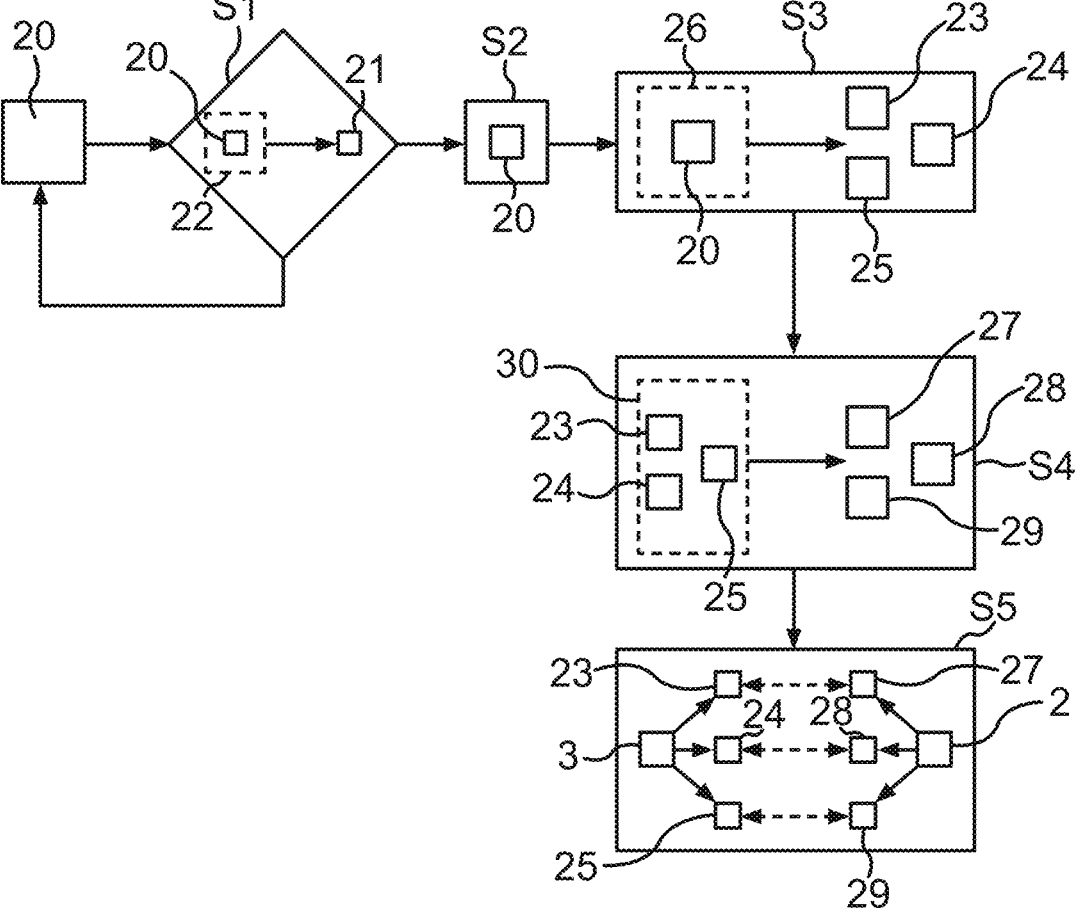
FIG. 2 shows a schematic representation of a signal flow graph of a method for operating a lighting device in a motor vehicle during an audio output of a breathing exercise in the motor vehicle, according to an example.

FIG. 2 shows method steps to operate the lighting device 2 in the motor vehicle 1 during an audio output of a breathing exercise 21 in the motor vehicle 1. In a method step S1, it can be checked whether the audio file 20 under consideration describes a breathing exercise 21. For this purpose, a breathing exercise recognition criterion 22 can be applied to the audio file 20. If it is established in this case that the audio file 20 describes the breathing exercises 21, in a method step S2, the audio file 20 can be provided. The provided audio file 20 is thus an audio file 20 which is intended for an audio output in the motor vehicle 1 and moreover describes the breathing exercise 21. Upon application of the breathing exercise recognition criterion 22 in method step S1, it can be checked, for example, whether the audio file 20 has a ratio of speech segments to calm segments, music segments, and/or noise segments characteristic for a breathing exercise 21, an overall duration characteristic for a breathing exercise 21, and/or a repetition of speech segments characteristic for a breathing exercise 21.

If it is established in method step S1 that the audio file 20 does not describe a breathing exercise 21, for example, method step S1 can be repeated for a further audio file 20. Further method steps S2 to S5 do not take place in this case, for example. Method steps S2 to S5 may only take place, for example, when it is established in method step S1 that the audio file 20 describes the breathing exercise 21.

In a method step S3, for example, at least two different audio sections among audio sections 23, 24, 25 of the breathing exercise 21 may be recognized by applying a section recognition criterion 26 to the provided audio file 20. The at least two sections 23, 24, 25 can be recognized, for example, in that they differ from one another for example at least in a ratio between speech segments, calm segments, music segments, and/or noise segments, in a length of individual speech segments, and/or in a repetition of speech segments. In an example, it can be provided that precisely three different sections 23, 24, 25 are recognized, as is outlined here. These may be assigned, for example, to an introductory phase of the breathing exercise 21, an exercise phase of the breathing exercise 21, and a conclusion phase of the breathing exercise 21. The introductory phase can alternatively be referred to as the intro and/or the conclusion phase can alternatively be referred to as the outro of the breathing exercise 21.

In a method step S4, an actuation command 27, 28, 29 for engaging the lighting device 2 can be ascertained for each of the recognized sections 23, 24, 25. This actuation of the lighting device 2 is to take place during the audio output of the respective section 23, 24, 25. It can be provided that an actuation command ascertainment criterion 30 is applied to the part of the audio file 20 assigned to the respective section 23, 24, 25 to ascertain the actuation command 27, 28, 29. The respective ascertained actuation command 27, 28, 29 can specify, for example, at least one brightness and/or one color, using which light is emitted during operation of the lighting device 2. In particular, a brightness course and/or a color course of the light emitted during the operation of the lighting device 2 can be specified by the actuation command 27.

It can be provided in one example that in in the method step S4, a further actuation command for actuating the at least one vehicle seat 10 and/or the climate control device 7 during the audio output of the section 23, 24, 25 may be ascertained for each of the recognized sections 23, 24, 25.

In a method step S5, the audio output of the breathing exercise 21 can take place by the audio output device 3 in the motor vehicle 1, wherein at the same time the lighting device 2 is operated according to the actuation command 27, 28, 29 of the section 23, 24, 25 which is currently being output. If the further actuation command for actuating the at least one vehicle seat 10 and/or the climate control device 7 was ascertained, during the audio output of the breathing exercise 21, the vehicle seat 10 and/or the climate control device 7 can be operated at the same time according to the respective further actuation command for the section 23, 24, 25 which is currently being output.

It can be provided in one example that a speech analysis of speech segments of the respective section 23, 24, 25 is carried out. It can be checked whether at least one predetermined signal word and/or at least one predetermined signal word combination is comprised by the section 23, 24, 25, wherein, if this is the case, the ascertained actuation command 27, 28, 29 can comprise an actuation of the lighting device 2 assigned to the signal word and/or the signal word combination. This can in particular take place simultaneously with the audio output of the signal word and/or the signal word combination, i.e. the actuation of the lighting device 2 can take place simultaneously with the output of the signal word and/or the signal word combination. For a speech segment which prompts inhalation, for example, a different color and/or brightness of the emitted light can then be selected than for a speech segment in which a prompt is made to exhale. Furthermore, for example, in calm segments, music segments, and/or noise segments between the two breathing instructions, a different actuation of the lighting device 2 can be selected, for example in a different color and/or with a different brightness in comparison to the speech segments having the signal word and/or the signal word combination.

Overall, the examples show a method for visualizing breathing exercises 21. Patterns and/or events can be read out by an upstream analysis, i.e. an analysis performed before the audio output, of the waveform of the audio file 20, so that the interior, the lighting device 2 here, can be set to the orchestration of the breathing exercise 21. The patterns and/or events mentioned in this case are, for example, the ratios between speech segments, calm segments, music segments, and/or noise segments, the length of the individual speech segments, and/or the repetition of speech segments. This is technically implemented, for example, in that after a user has selected the breathing exercise 21 for playback, the waveform of the audio file, in particular items of information on the volume, are analyzed before the audio file 20 is played.

In a breathing exercise 21, three characteristic components may be recognized here, i.e. the three sections 23, 24, 25. These are the intro (introductory phase), the outro (conclusion phase) and the component having the actual breathing exercise 21 (exercise phase) here. The latter section 23, 24, 25, i.e. the exercise phase, is distinguished by a repeating pattern with respect to, for example, alternating speech segments and calm segments or music segments. An intensive experience for the breathing exercise 21 can be orchestrated for the listener on the basis of the described analysis, in that, for example, the ambient illumination and therefore the lighting device 2 is triggered depending on the respective component, i.e. is actuated depending on the actuation command 27, 28, 29 for the respective section 23, 24, 25.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in Superguide v. DIRECTV, 358 F3d 870, 69 USPQ2d 1865 (Fed. Cir. 2004).

The invention claimed is:

1. A method of operating a lighting device in a motor vehicle during an audio output of a breathing exercise audio file in the motor vehicle, comprising:

receiving an audio file, which is intended to be provided for an audio output in the motor vehicle and configured to describe a breathing exercise;

recognizing at least two different audio sections among audio sections of the breathing exercise described in the audio file by applying an audio section recognition criterion among audio section recognition criteria to the audio file;

for each audio section of the audio sections recognized, ascertaining a corresponding actuation command to actuate the lighting device during the audio output of the audio section; and outputting, based on the audio file, an audio of the breathing exercise by an audio output device in the motor vehicle and at a same time operating the lighting device according to the corresponding actuation command for the audio section, which is currently being output.

2. The method according to claim 1, wherein before the audio file is provided, checking whether the audio file describes a breathing exercise by applying a breathing exercise recognition criterion to the audio file, and the audio file is only provided if established that the audio file describes the breathing exercise.

3. The method according to claim 2, wherein upon the applying of the breathing exercise recognition criterion, checking for at least one breathing exercise criterion among breathing exercise criteria including, whether the audio file has a ratio of speech segments to calm segments and/or music segments, noise segments characteristic for a breathing exercise, an overall duration characteristic for a breathing exercise, and/or a repetition of speech segments characteristic for a breathing exercise.

4. The method according to claim 1, wherein the at least two different audio sections are recognized in the audio file based on at least one difference criterion among difference criteria including, a ratio between speech segments, calm segments, music segments, and/or noise segments, in the audio file, in a length of individual speech segments in the audio file, and/or in a repetition of speech segments in the audio file.

5. The method according to claim 1, wherein three different audio sections among the audio sections recognized are assigned as an introductory phase, an exercise phase, and a conclusion phase, of the breathing exercise.

6. The method according to claim 1, further comprising:

performing a speech analysis of speech segments of the audio section to check whether a signal word and/or a signal word combination is included in the speech segments, such that if the signal word and/or the signal word combination is included in the speech segments, the corresponding actuation command comprises an actuation of the lighting device assigned to the signal word and/or the signal word combination, which takes place simultaneously with an output of the signal word and/or the signal word combination.

7. The method according to claim 1, wherein the corresponding actuation command specifies at least one brightness and/or one color, using which light is emitted during an operation of the lighting device, wherein the corresponding actuation command specifies a brightness course and/or a color course of light emitted during the operation of the lighting device.

8. The method according to claim 1, further comprising ascertaining for each audio section of the audio sections, a further actuation command for actuating a vehicle seat in the motor vehicle and/or a climate control device of the motor vehicle during the audio output of the audio section, wherein during the audio output of the breathing exercise, at a same time the vehicle seat and/or the climate control device is operated according to the further actuation command for the audio section which is currently being output.

9. A motor vehicle having an audio output device and a lighting device, wherein the motor vehicle includes a control device configured to perform the method according to claim 1.

10. The motor vehicle according to claim 9, wherein the lighting device comprises an ambient illumination of the motor vehicle.

* * * * *